Figure 8:
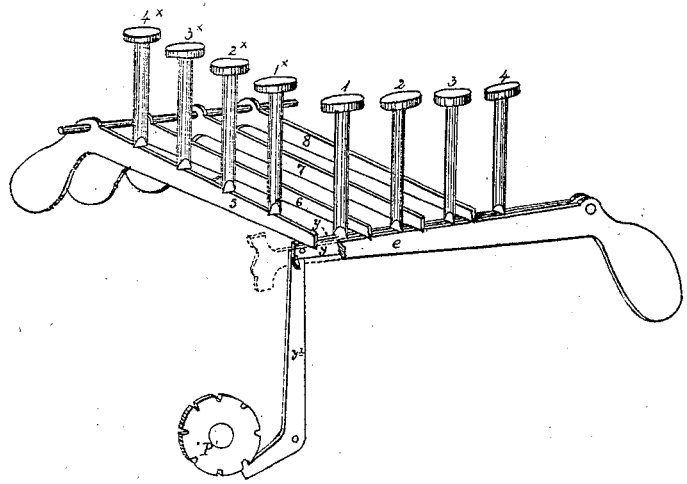

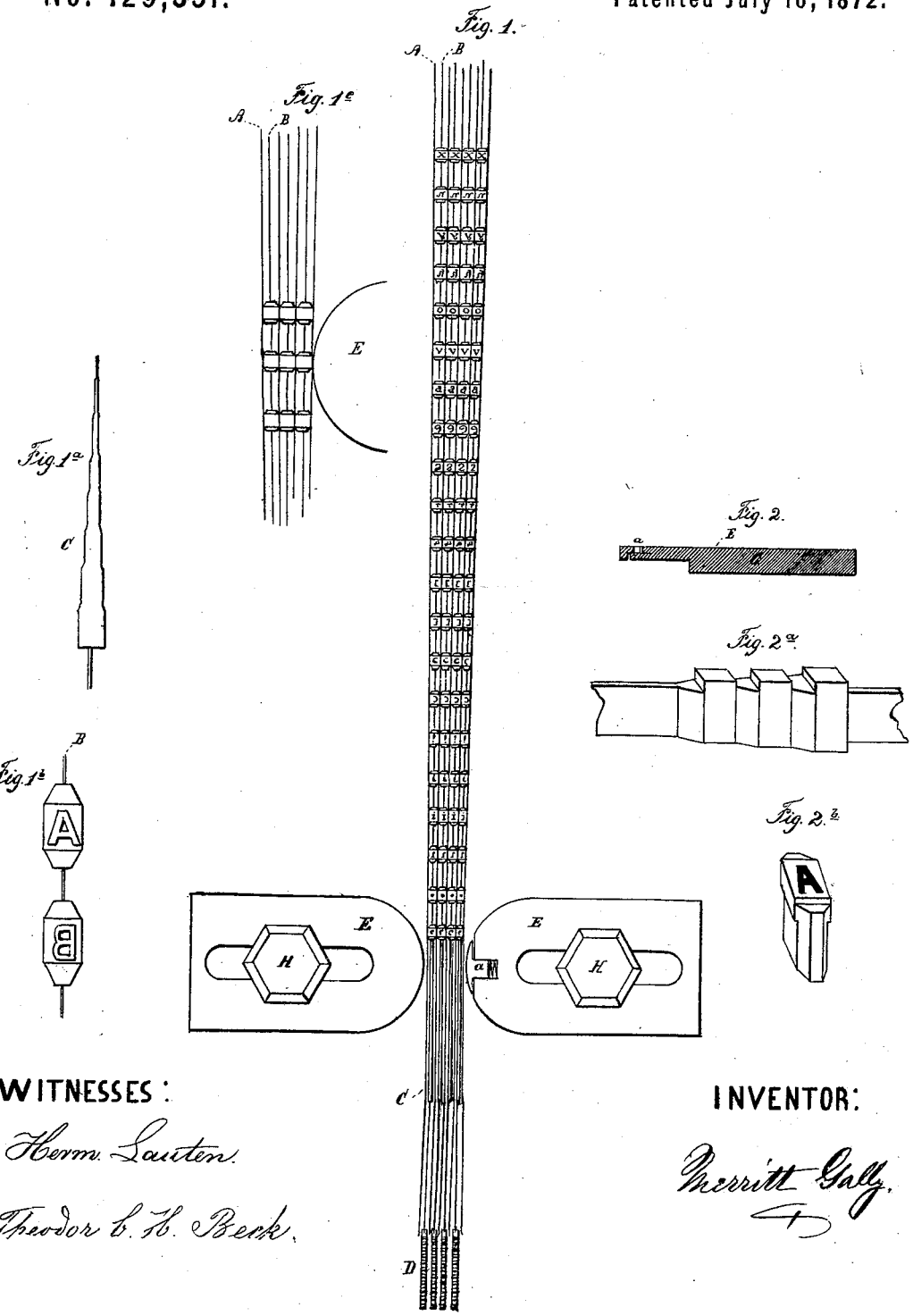

4 Sheets--Sheet 2.

M. GALLY.

Combined Stereotyping and Telegraphing Machine.

No. 129,331.

Patented July 16, 1872.

WITNESSES:

Herm Lauten

Theodor C. H. Beck

INVENTOR:

Merritt Gally

M. GALLY.
Combined Stereotyping and Telegraphing Machine.
No. 129,331. Patented July 16, 1872.
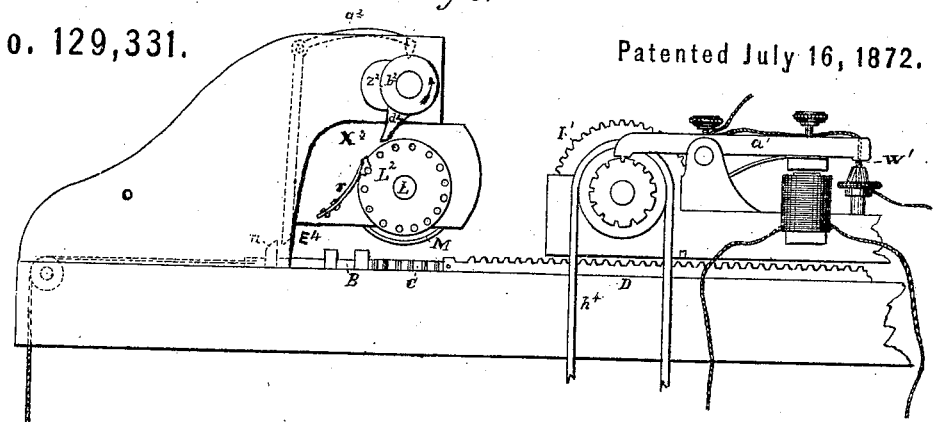
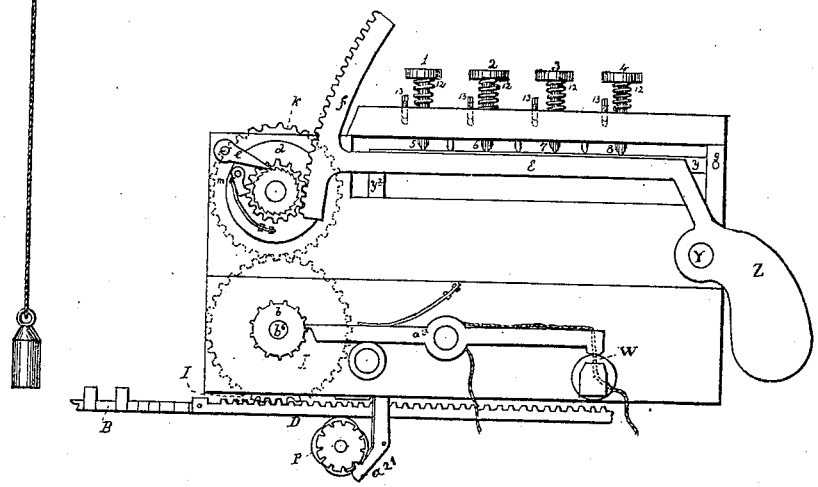
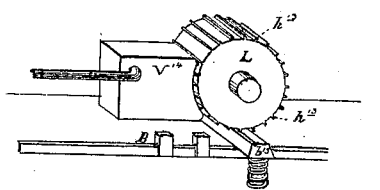
WITNESSES:
Herm Lauten
Theodor C. H. Beck
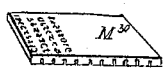
INVENTOR:
Merritt Gally 4 Sheets--Sheet 4.

M. GALLY.

Combined Stereotyping and Telegraphing Machine.

No. 129,331.  Patented July 16, 1872.

WITNESSES:  
Herm. Lauten  
Theodor & H. Beck

INVENTOR:  
Merritt Gally

129,331

UNITED STATES PATENT OFFICE.

MERRITT GALLY, OF ROCHESTER, NEW YORK.

IMPROVEMENT IN COMBINED STEREOTYPING AND TELEGRAPHING MACHINES.

Specification forming part of Letters Patent No. 129,331, dated July 16, 1872.

*To all whom it may concern:*

Be it known that I, MERRITT GALLY, of Rochester, in Monroe county, and State of New York, have made a new and useful invention pertaining to the Making of Stereotypes or Stereotype-Molds, of which the following is a specification:

The object of my invention is, first, to do away with the necessity of the use of movable types, either in forms or parts of forms for letter-press printing, or in forms or parts of forms from which stereotypes are prepared for press; and second, to enable operators, who are preparing matter for press in one locality to reproduce the same in other localities at the same time, either in form of stereotype or stereotype-mold; also, to enable the operator, if he desires, to produce the mold or stereotype only at a distance.

The first part of my invention consists, first, in a mechanism which shall mechanically arrange and rearrange an alphabet or alphabets of dies, which dies shall form impressions in the material for a mold corresponding with the composition of matter desired in a stereotype; and, second, in the same or similar mechanism with a substitution of female dies, and other appliances, changes, and attachments made necessary by such substitution of dies, and the work to be done, as shall enable the operator to produce directly the stereotype instead of the mold. The second part of my invention consists in working a machine by means of electrical connections, when such machine is used for preparing matter for letter-press printing, either in arranging types for press, in making molds formed by a mechanical arrangement of dies, or in producing directly by mechanical means a stereotype.

Figures of the Drawing.

Figure 3:
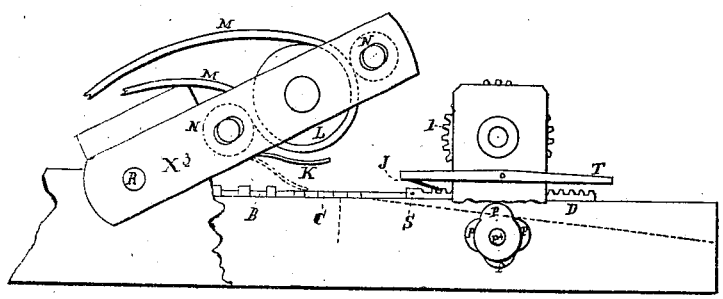
Figure 6:
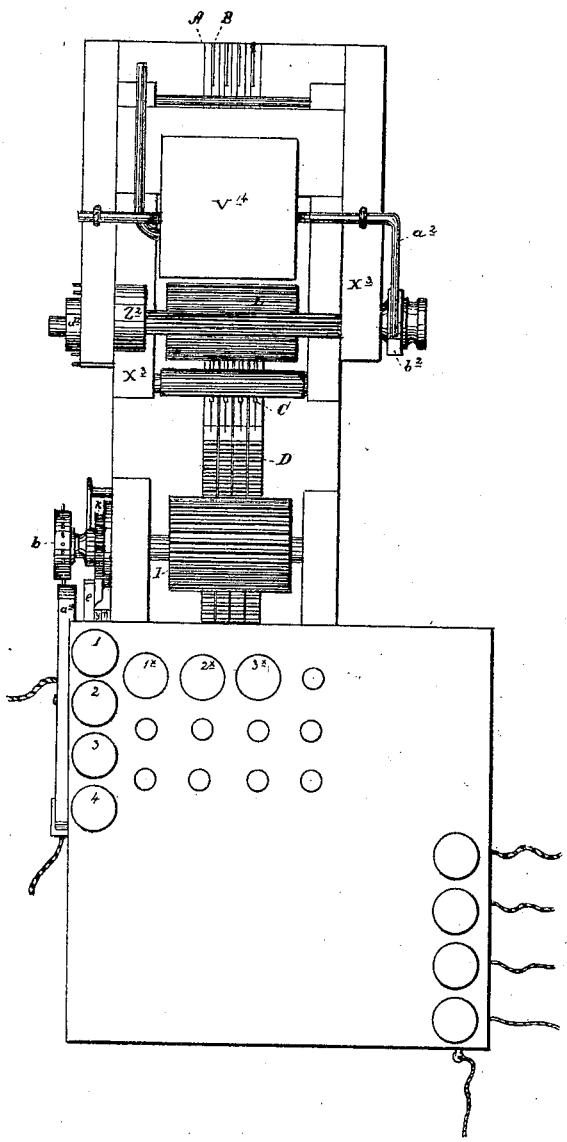

In the accompanying drawing, Figure 1 is a plan of a part of an alphabet of dies, attached to flexible strips or connections; also, side gauges, spaces, and racks. Fig. 1ª is a plan of the compound graduated space with beveled connections enlarged. Fig. 1ᵇ is a plan of the male dies with the connections, showing two of the dies enlarged. Fig. 1ᶜ is a plan of dies with flexible connections, showing the connections bent out of their regular course by the lining of a certain number of the dies. Fig. 2 is a sectional view of the gauge E of Fig. 1. Fig. 2ª is a perspective of graduated compound space enlarged. Fig. 2ᵇ is a perspective of female die, showing the sides cut away to allow room for intermediate guiding-strips, when such are used between the dies, enlarged. Fig. 3 is a side elevation, with parts of supporting parts cut away, showing dies, spaces, and gear with racks; also, a succession of cams for bringing the different racks into gear as needed; also, lining-pawls and space-retaining pawls. Figs. 4 and 5 are side elevations, showing the means of manipulation when the mechanism is operated by keys; also, slip-gears, pulleys, levers, and cams allowed movements for operating the machine by means of electrical connections. Fig 6 is a plan, showing the principal parts of the machine. Fig. 7 is a perspective of the apparatus for constructing molds or stereotypes from soft or plastic material; also, a sample of mold. Fig. 8 is a perspective, showing the arrangements of levers and keys; also, the device for operating the cam-shaft.

General Description.

The letters of the alphabet, figures, and punctuation-points occupy spaces differing in breadth, and for this reason common types vary in thickness. In constructing the machine above referred to, I arrange a set or sets of dies representing an alphabet, figures, and points, as many of each or the several kinds as necessary for the work to be done, in such a manner that the variation of space occupied is graduated by nearly a regular increase. These dies I attach either to flexible continuous strips, or to jointed strips or cords allowing flexion. I attach the dies far enough removed from each other to allow the flexible strip or other connection between the dies to bend freely, so that when the dies of different sets or strips placed side by side are pressed together, the dies will be easily set squarely in a line across the series of strips, this being allowed by the flexion of the strips or connections, while, on account of the varying width of the dies of each strip, those dies outside of the arranged line, forming radial or fan-like lines in the direction of the strips, will not stand squarely with each other unless forced to do so by the flexion of the strips, as in case of the arranged line. My object in connecting the dies together with connections or attaching them to flexible strips, is, first, to have them so connected together as to be able to move or control their movement by a positive action; secondly, that they may have certain fixed positions on the strip or connections, allowing their position in respect to each other to govern their position in relation to other parts of the machine, without rigidly fixing them to any part; and, thirdly, to allow deviation of the dies when arranged in a line for making an impression, from their position and course as compared with the dies outside the arranged lines, without in the least diminishing the positiveness of their movements when set in motion or the perfect control of their position. On common types there is a slight shoulder to form a space between the characters set side by side. Instead of making a shoulder upon the dies represented in Fig. 1, I place other similar flexible strips or connections between the sets of dies, as represented by A, Fig. 1. These strips act as guides, allowing the strips having dies to slide by each other, at any desired rate of speed, without collision of the dies. Although these guiding-strips are desirable, especially when the dies are moved at a high rate of speed, nevertheless they are not absolutely necessary to the working of the machine. Although the dies may collide without them, nevertheless the dies may be so shaped as not to be materially interrupted in their movements. By beveling or curving the corners of the dies, as shown in the enlarged views, Fig. 1$^b$ and Fig. 2$^b$, the dies will slide by each other without catching. In using the female dies in connection with the intermediate guiding-strips I either cut away the side of the dies to allow space for the intermediate strip, or extend the portion of the intermediate strip which is in line between the side gauges to a height equal to the height of the die, so that the blank face of the entire line of dies, when arranged for making the impression, may be unbroken. This prevents a fin being formed between the letters of the stereotype. The female die, with sides cut away, is shown by Fig. 2. For regulating or preserving equality in the length of the lines stamped into the mold or stereotype, I use adjustable side gauges E E. These gauges may be set to accommodate a column or page of matter of any desired width. I cut away a portion of the face of one or both of these side gauges, so that the die-strips which are not used in filling the arranged line may slide by the face of the gauges and not obstruct the space to be occupied by the line arranged. The sides of the dies are so arranged in relation to the plane of that portion of the gauges not cut away as to insure the passage of every die moved to the line between the faces of the gauges determining the length of the line, but the strips or connections by which the dies are connected and moved lie in a plane corresponding to the plane of the part of the side gauges which is cut away. It will be readily seen that any strip or number of strips on which no die is brought forward between the gauges may be crowded into the space cut away from the gauge and will not interfere with the strips or dies of the arranged line. The face of the side gauges in that part which comes in contact with the dies is curved or set at an angle with the line of direction of the strips, so as to insure an easy entrance to the dies between the gauges. That part of the face of each gauge which governs the length of the line arranged is at right angles to such arranged line, so that pressing the line of dies having parallel sides together between the gauges will cause the dies to stand squarely in position. As the die-strips, when taken together, form radial or fan-like lines, it will be seen that equal movements of each of the die-strips will not necessarily make the arranged line of dies to form a direct or straight transverse line, but it may be curved more or less. To straighten the arranged line of dies I use lining-pawls K, Fig. 3, which for convenience in illustration, are placed above the dies, and catch each die as it is drawn forward as soon as the die-strip is relieved from the power applied for its forward movements, and acted upon by the weights or other means for giving a return movement to the strip. As the pawls for the several die-strips are in a perfect line, the line of dies adjusted by means of the pawls must also be in a perfect line. In the working-machine the pawls are arranged under the die-strips and connect with teeth on the strip. After the line of dies has been used for making an impression the lining-pawls are relieved, and the die-strips are drawn back for another or rearrangement of the dies. For spacing the arranged line of dies I use a compound space or spaces, as shown in Fig. 1$^a$. The compound space C is formed of a number of spaces of varying widths connected by beveled or wedge-like connections. I attach this compound space to the die-strip or connections, and operate it to some extent by the same means as the dies. The sections of the space may be rigidly connected together by means of the beveled connections, or may be more or less separated, allowing flection, as in case of the dies, but still forming a compound space with dependent parts. The sections of the compound space, when used with the female dies, act as blank dies. The spaces may be, if desired, attached to other than the die-strips, and acted upon separately. The figures of the drawing illustrate the spaces attached to the die-strips. When the die-strip is brought forward, not far enough to bring a die to the line being arranged, but brings one of the sections of the space to the line, the die-strip is not acted upon by the lining-pawl, but is held by a space-retaining pawl, which in the figure is represented by J. Each compound space has its retaining-pawl. Now, it will be seen that, by arranging the dies of the line with the thinner sections of the spaces between the words until another syllable cannot be brought in, if the line is not justified, all that will be necessary will be to relieve at the same instant all the spaces retained by the several retaining-pawls, and a uniform advancement of the graduated spaces will increase the several spaces between the words, and the line will be perfectly justified. If care is taken to set the proper section of space in its proper place in the first arrangement of the line the final justification will of necessity produce the most accurate and artistic justification, which is exceedingly desirable, especially in fine book-work. This method is indeed more perfect than the most careful hand-spacing in type-setting. In order that the compound spaces may not stop with the beveled connections between the dies of the line, I make the face of either one or both of the side gauges so that it will allow a slight yield; and by applying a slight increase of power to the space, and that for only a short movement, the next section of the spaces will be forced between the dies, and square them in the line. The variation between the widths of the sections of the spaces I make so slight that the increased length of the line by the extra movement of the spaces and yielding of the gauge will not be apparent to the eye. The yielding part of the face of the gauge is represented by $a$, Fig. 1, having a spring for allowing it to yield. I give motion to the die-strips, in bringing forward the dies or spaces, by means of a rack attached to the die-strip, as shown by D, Fig. 1. I give motion to this rack by means of the gear-wheel I. Motion may be given to the rack or racks by belt or friction-gear, or by means of swinging levers; but I use the toothed wheel and rack to insure positiveness and exactness in the movement. I engage and disengage the rack or racks with the spur-wheel I by means of the cams P placed in order upon the shaft $P^4$. As each rack is disengaged the succeeding cam engages the next rack in order, and so on until racks of a sufficient number have been engaged to bring forward a sufficient number of arranged dies to fill the measure between the side-gauges. This operation is repeated for each succeeding line. The line of cams upon the shaft has a spiral arrangement, so that one will cease to act when the next begins its action upon its rack. It will be seen that with weight or power otherwise applied at the opposite extremity of the die-strips, said die-strips would instantly fly back when the rack is disengaged, after a movement of the gear, were it not for the retaining-pawls. When necessary to return all the die-strips after having been brought forward and an impression made upon the dies, it is necessary that all the racks be disengaged. The cams on the shaft $P^4$ do not, therefore, act immediately one after the other, but they have a space between, where the die-straps are all relieved by disengagement of all the racks. This space occurs between every two of the cams, so that between any two cams the racks may be all relieved. In the drawing only four die-strips, racks, and cams are represented. These, in a working machine, would be increased to a number equal to any width column or page of matter required. The toothed wheel I may be operated upon by any convenient means of operation. For ease and accuracy of manipulation I work the same by means of an operating lever with toothed segment $e f$; and in order to work the wheel I in one direction only, I use the ratchet slip-gear $c\ d\ l\ m$, Fig. 4. In the drawing I show two gears $k$ I for connection with the toothed segment $f$. The toothed segment might, however, with the same results, connect with its slip-gear, said slip-gear being placed directly upon the shaft $b^6$ by making the toothed segment internal instead of external. The lever $e$ is actuated by means of keys, 1, 2, 3, &c. These keys are so arranged in reference to the lever that an equal movement of the keys will give each a different movement to the lever. If the points of contact of the keys with the lever were all on a radial line between the toothed segment $f$ and the pivot Y, the equal movement of the keys would give regularly-increasing movements to the lever. If constructed as shown in the figure, a slight difference in the length of the stems of the keys is necessary to secure such a regular gradation. The lever $e$ is counter-weighted at $z$, and, to compensate for the difference in force to work the toothed segment $f$ by means of the different keys, springs of different tension are used to regulate the "touch" of the keys. These springs are made adjustable by means of an adjusting-nut, 12. It will be seen that a depression of a key will give through the lever $e$ and its connections a certain amount of movement to the die-strip that may be in connection with the wheel I, and in order that this movement be exact, or sufficiently so, the movement of the key is made adjustable by means of the screw-stop 13. In order that the key may not give a variable movement to the lever at its point of contact, the stem of the key is furnished with a connecting edge, which secures a single line of contact. Connected with the lever $e$ are sub-levers 5, 6, 7, 8, &c., which also are furnished with keys in like manner as lever $e$. By the action of these levers the movements of lever $e$ produced by keys 1, 2, 3, &c., may be regularly subdivided to any extent with mathematical accuracy, all the keys having an equal movement. Facility in operating the keys is secured by the fact that all have a certain and equal movement; and also by the fact that they have an even "touch" secured by the springs of different tension. By placing the lever $e$ at the right of the keyboard the increased movements of the die-strips will be made by the keys on the right-hand portion of the keyboard, and the keys will follow in order with an approximate correspondence with the arrangement of dies on the die-strips. This facilitates manipulation, as it brings the keys for the smaller letters and points at the part of the keyboard nearest the natural position of the hand. Before coming in contact with the lever $e$, the keys or sub-levers first strike the lever $y$ with connection $y^2$. The connection $y^2$ operates the cams P by connection with its shaft, turning the shaft far enough to bring up the next cam in order by a common ratchet movement; or if power be applied to the shaft by friction or otherwise, allowing movement to the shaft by slipping a tooth, shown at $a^{21}$, Fig. 4, when the tooth is used the shaft would present as many meshes for the teeth as there are cams on the shaft.

The material for the mold or stereotype I place upon or pass around the polygonal roller L. The faces of this roller correspond with the width of the line to be compressed in the material, and either the faces or entire rollers are made changeable, so that rollers with lines of different dimensions can be used. After each depression of the roller for an impression upon the dies the material is moved one space for the next impression by the turning of the roller.

When an impression is to be made the wheel $b^2$ is allowed movement for a single revolution by the slipping of the tooth of the lever $a^2$. The spur $d^2$, by connecting with one of the pins of the wheel $L^2$, which is attached to the roller L, turns roller L one space, after which cam $Z^2$ presses down the movable frame $X^3$ of the roller, and presses the material M upon the line of arranged dies. The roller-frame is then raised to its former position by means of the spring $e^4$.

The roller L is made changeable for compression upon the dies of the material for stereotype or mold by attaching faces of different widths to correspond with different sizes of dies, or for lines more or less widely separated. The same result may be obtained by having a number of rollers having faces of different widths, these rollers to be changed one for another as the case demands.

The roller L is held in position by means of a spring-catch, $r$, as shown in the drawing. The crown-wheel $L^2$ may be changed for another when there is a change of roller, so that roller and crown-wheel will correspond. The pins of the different crown-wheels have positions corresponding with the different widths of faces of the rollers.

In order to insure constant contact of material M with roller L and secure a positive movement of the material by the motion of the roller, I use yielding guide-rollers N, which press upon the surface of the material M, as shown in the drawing, Fig. 3.

In operating the machine, in order to work the lever-catch $a^2$ and produce the impression of the material, it will only be necessary to work a key that will move a die-strip having on it the spur $n$ (or an extra strip having the spur for that purpose) a distance greater than that required for the whole number of dies on a strip, which will bring spur $n$ in contact with a connecting-arm, $e^1$, that will work lever-catch $a^2$.

The shaft of the depressing-cam is actuated by a weighted cord or friction power, and it will be seen that the slipping of the lever-catch will allow a revolution of the shaft, and thus produce the feeding of the material and the impression of the material upon the dies.

The wheel I, Fig. 4, is turned a certain number of teeth for bringing forward to the arranged line of dies each succeeding die of each strip. Upon the shaft of wheel I I place a spur-wheel, $b$, with a number of teeth, so arranged that a certain number, one or more, shall represent the number of teeth of wheel I used for bringing forward each successive die of the strip. In connection with the spur-wheel $b$ I use the striking-lever $a^{12}$. By turning the wheel I, by means of the actuating-keys of the key-board, each tooth of the wheel $b$ will make and break the connection of an electric current, as shown at W in Fig. 4.

Now, if the electric current is extended to the striker at $W^1$, Fig. 5, an equal number of meshes or a number corresponding with the number of teeth moved in wheel $b$, will be slipped by lever $a^1$ on wheel X, Fig. 5; the wheel X, being actuated by weight or friction power, will turn wheel $I^1$ of Fig. 5 to correspond with the movement of wheel I of Fig. 4, producing like results.

Both the entire machine, Fig. 4, and the entire machine, Fig. 5, may by this means be operated by a single operator, although the machines may be far separated, and the stereotypes produced by both machines will exactly correspond.

If the operator desires to produce the stereotype or mold only at a distance, it will be necessary to use only the key-board and connections with wheel $b$ of the machine, Fig. 4, and make the electrical connections with any number of distant machines.

Other spurs, having a greater movement than the spur $n$, may be used for making mechanical connections for the movements of any number of parts of the machine. So will be seen that, whether operating direct a machine by means of the operating-keys by means of an electric current, the oper will have full control of the machine opera When electric currents are used for operating a machine or machines greater speed may be obtained by omitting the extended movements required to operate the spur $n$ or succeeding spurs, and instead thereof connecting different parts of the machine and operating-keys, or different parts of different machines by different electric currents acting independently. In this manner a short and simple stroke may slip the gear of any part of a machine independent of the other parts, and in whatever order desired by the operator. In this manner the frequently-recurring movement of the rack-engaging cams, preceding each movement of the wheel I, may be accomplished independently by a single stroke, connecting an independent current with the lever-connection $y^2$; or the lever $a^2$ may be operated in the same manner, or the lining and retaining pawls. Although a single electric current may, as described, be made to operate an entire machine of any number of parts or movements, nevertheless it will be clearly seen that a number of independent currents, brought to bear on different parts, will greatly facilitate speed and ease of manipulation. For example, by working the lining-pawls by an independent current a die or number of dies, improperly set in the line, may be instantly returned to place for rearrangement or correction.

To secure a material for stereotype or mold which shall have in itself the quality of allowing compression of one part of its face without displacing other parts, I make a granulated substance, or attach to a fibrous or elastic backing a thin plate of material with vertical fiber; but as these are distinct inventions, in themselves considered, and alternatives, I reserve them for other specifications. For constructing a mold or stereotype from paper or other soft material, the faces of the polygonal roller are separated by thin guards $h^{13}$ $h^{13}$, which project from the roller L a distance equal to the thickness of the material to be used, less the thickness of said soft material when compressed to a solid. A counter-guard with two thin edges, $b^{15}$, or two single guards, present an edge to the face of the material to be impressed by the arranged line of dies. The edges of these guards are counter to the edges of the guards of roller L, between which the line of dies is to make an impression, and before the impression is made the two sets of guards are brought as nearly in contact as a firm compression of the mold material will allow, entirely separating the softer portion of mold material, which is to receive the impression of the line of dies from the parts of the mold formed or to be formed thereafter. The material, when passing onto the roller L, is pressed against the guards of the roller, so that only the harder portion of the material comes between the counter-guards while the material is in position for the impression of the dies. Before leaving roller L the material formed into mold or stereotype passes by the heated drier $v^{14}$, which dries it before handling.

The advantages secured by my invention are: First, the necessity of type-setting and distributing are obviated. Second, a single operator is enabled to prepare for press a quantity of matter which would require the labor of a large number of type-setters to duplicate. Third, a single operator is enabled to produce any number of forms and in any number of different or distant places or the same place by the operation necessary for a single form. Fourth, transmission of copy by telegraph for compositors, with the necessary operators, copyists, and messengers at both ends of the line, and the same number of operators, copyists, and compositors for every different locality where telegraph matter is now prepared for press by compositors "at the case," is all obviated—for example, a single operator, employed for the "Associated Press," may, instead of sending messages to different parts of the country to be copied and then put in type by an army of compositors, be enabled himself, alone and unaided, to prepare directly, without messages or copy, forms or stereotypes for press in as many parts of the world as he desires. Thus, the speeches in Congress, e. g., may not only be reported, but a stereotype of the report be prepared by one man in every printing-office in the United States up to the very moment of "going to press." Fifth, the transportation of heavy and cumbersome newspaper-mails may be done away with and mail carrying become a source of profit to the government, being confined mostly to letter carrying. For example, the "New York Tribune," instead of being transported to distant parts of the country with news stale and out of date, may be, by a single set of operations, prepared for press in as many localities as desirable. The "London Times" may be issued the same hour both in London and New York; and, lastly, I mention the increased facility for the diffusion of useful knowledge to the inhabitants of an entire world.

*Claims.*

What I claim as my invention, and desire to secure by Letters Patent, is—

1. A series of die-strips or connections having dies of varying widths thereon, when they are flexible and are arranged side by side in a plane, for the purpose of permitting the dies to be turned out of their direct course, when required, and sit closely together in the line without throwing the dies "off their feet," or twisting or kinking the strips, substantially as set forth.

2. One or more sets of dies, the arrangement of each or any set being in such order that the difference in the thickness of the dies will vary by a gradual increase or decrease, so that the dies will require to be turned only slightly out of their course when set squarely together in the line, substantially as set forth.

3. In combination with one or a series of die-strips, other flexible strips for guiding the die-strips in their movements and preventing collision of the dies, substantially as set forth.

4. The gauges, one or both, having a portion cut away to permit the die-strips not in use to pass beyond the extremity of the line as measured by the gauges, substantially as set forth.

5. The compound space, the sections of which gradually increase in width, and which are connected by bevel-connections or their equivalents, substantially as set forth.

6. The combination, with the compound spaces, of their retaining-pawls, substantially as set forth.

7. Combined with the die-strip or strips having a rack or racks attached, the cam or cams for engaging and disengaging the rack or racks and gear, substantially as set forth.

8. The described arrangement of the cams upon their shafts, so as to bring the racks consecutively into gear, substantially as set forth.

9. The arrangement of a compound space upon a die-strip, substantially as set forth.

10. The method, herein set forth, for increasing the spaces set in the line—i.e., by the simultaneous movement of the compound spaces—to insure perfect and artistic justification.

11. The combination of the spur $n$ or equivalents with the catch or pawl $a^2$, for the purpose set forth.

12. The combination of a mechanism for automatically arranging types, dies, or matrices and an electric telegraph instrument for the purpose of securing at a distance the arrangement of a line or lines before an impression is taken.

13. The body of the dies having beveled corners to prevent collision of the dies when used either with or without the intermediate guiding-strips, substantially as shown.

14. Combined with the operating-lever, a system of sub key-levers, substantially as described, to operate a short operating-lever by any required number of keys.

15. The guards $h^{13}$ and $b^{15}$ or their equivalents, in combination with the soft material $M^{30}$, substantially as set forth, for the purpose of constructing different parts of the mold or stereotype separately, preventing the impression of one part from displacing another part previously formed, securing a perfect stereotype or mold without the use of an entire form.

MERRITT GALLY.

Witnesses:
F. S. LAMSON,
D. C. ALLEN.